(12) United States Patent
Berg et al.

(10) Patent No.: US 11,303,499 B2
(45) Date of Patent: Apr. 12, 2022

(54) MOVING NODES IN A DISTRIBUTED SYSTEM

(71) Applicant: Amazon Technologies, Inc., Seattle, WA (US)

(72) Inventors: Paul William Berg, Seattle, WA (US); Christopher Dunn, Seattle, WA (US); Alex Jennifer Tribble, Seattle, WA (US); Tristan Daniel Fries Wilson, Seattle, WA (US); Zachary Jared Wiggins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/531,465

(22) Filed: Aug. 5, 2019

(65) Prior Publication Data
US 2019/0356530 A1    Nov. 21, 2019

Related U.S. Application Data

(63) Continuation of application No. 14/231,010, filed on Mar. 31, 2014, now Pat. No. 10,374,866.

(51) Int. Cl.
*H04L 29/08* (2006.01)
*H04L 67/10* (2022.01)

(52) U.S. Cl.
CPC ............................. *H04L 29/08135* (2013.01)

(58) Field of Classification Search
CPC ................................................ H04L 29/08135
See application file for complete search history.

(56) References Cited

U.S. PATENT DOCUMENTS

| | | | |
|---|---|---|---|
| 2011/0022711 A1* | 1/2011 | Cohn | H04L 41/04 709/225 |
| 2012/0324073 A1* | 12/2012 | Dow | G06F 9/5088 709/223 |
| 2012/0324445 A1* | 12/2012 | Dow | G06F 9/45504 718/1 |
| 2013/0219043 A1* | 8/2013 | Steiner | G06F 9/4856 709/224 |
| 2013/0346572 A1 | 12/2013 | Jain et al. | |
| 2015/0163157 A1* | 6/2015 | Hao | G06F 9/5072 709/226 |
| 2016/0226789 A1* | 8/2016 | Sundararajan | H04L 67/1008 |

\* cited by examiner

*Primary Examiner* — Suraj M Joshi
(74) *Attorney, Agent, or Firm* — Davis Wright Tremaine LLP

(57) ABSTRACT

Techniques for improving communications efficiency between pairs of communication nodes running within a computer system are described herein. Potential locations for placing a communication node are evaluated using one or more fitness values wherein the fitness value is based at least in part on one or more system metrics associated with placing a communication node in the potential location. If an improved location is found based on the fitness value, the communication node may be migrated to the new location, thus improving system efficiency.

20 Claims, 11 Drawing Sheets

MOVING NODES IN A DISTRIBUTED SYSTEM

CROSS-REFERENCE TO RELATED APPLICATIONS

This application is a continuation of U.S. patent application Ser. No. 14/231,010, filed on Mar. 31, 2014, entitled "MOVING NODES IN A DISTRIBUTED SYSTEM," which is incorporated herein by reference for all purposes.

BACKGROUND

Modern computer systems are frequently implemented with a plurality of computer services that operate on one or more host computer environments and that are distributed across one or more physical and/or logical locations. Client computer systems request information from computer system services in order to provide functionality for computer system users. Initial placement of computer system services might be performed according to proximity of clients, but as the location of clients can quickly change, an initially efficient placement of a service can rapidly become inefficient. As computer system services are required to communicate with one another, an inefficient location of a service where there is, for example, high network latency between the clients and the service, may lead to system slowdowns and system outages which may impact system availability and performance. This impact on system availability and performance may, in turn, negatively impact the experience of computer system users.

BRIEF DESCRIPTION OF THE DRAWINGS

Various embodiments in accordance with the present disclosure will be described with reference to the drawings, in which.

DETAILED DESCRIPTION

Figure 1:
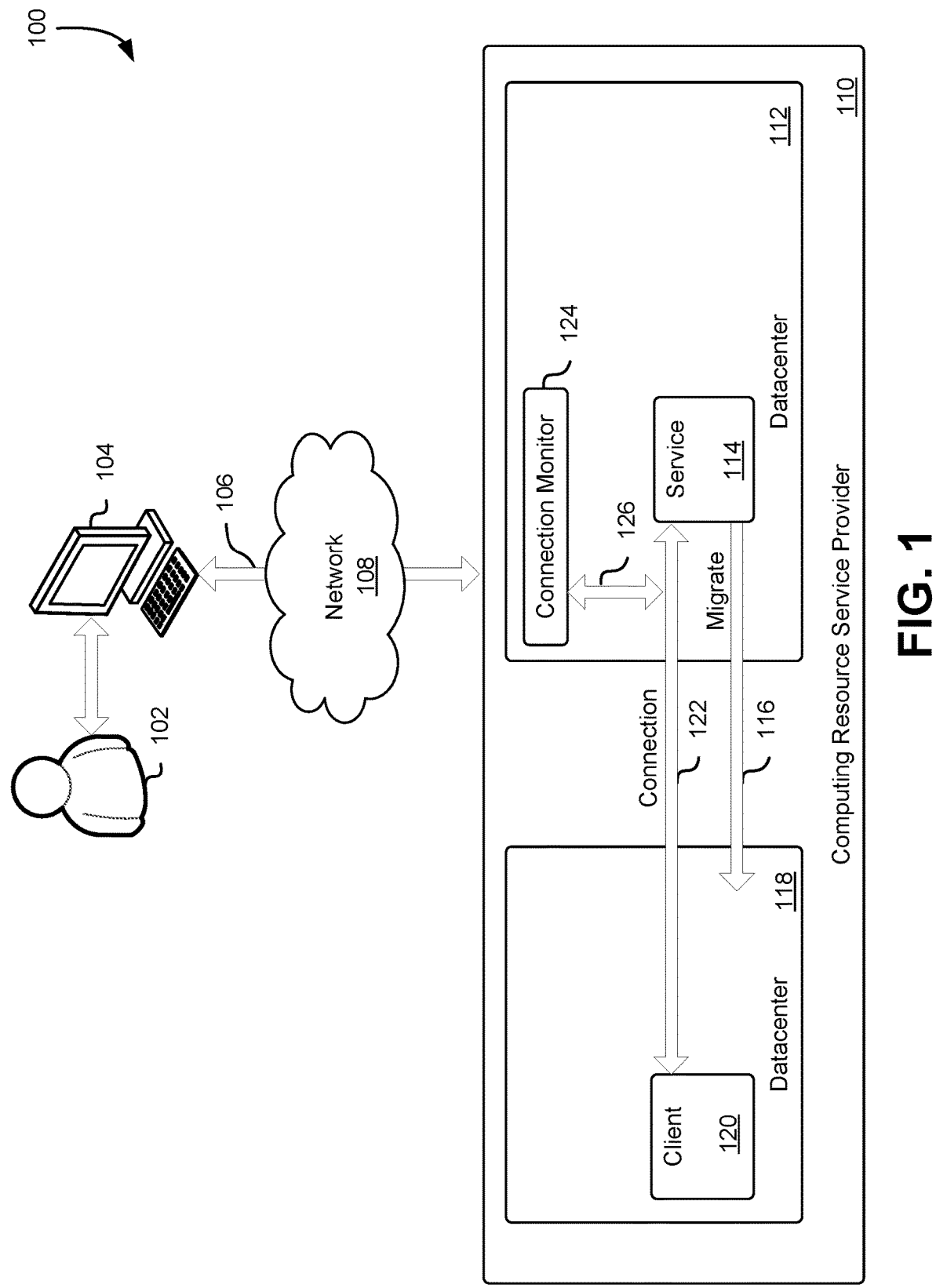
FIG. 1 illustrates an example environment where services may be moved to more improved locations based at least in part on client locations in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for dynamically updating the placement of web services to computer system hosts that are closer to the web service clients. As used herein, unless otherwise stated or made clear from context, the term "service" may be understood to be a computer system program, process, application, module or a combination of these and/or other such computer system entities. A "service" may be configured to receive requests from clients within a computing environment and/or to send responses to those client requests. As used herein, unless otherwise stated or made clear from context, the term "computer system" may be understood to be one or more hosts, servers, devices, virtual devices and/or other such operational entities, operating in a distributed, virtualized and/or datacenter environment and the term "datacenter environment" (also referred to herein simply as a "datacenter") may be understood to be one or more datacenter locations that may be used to host a distributed and/or virtualized computer system.

While the present disclosure describes techniques for moving services closer to clients of services and/or for moving clients closer to services, the scope of the present disclosure extends generally to the movement of communications nodes with respect to the location of other communications nodes within a distributed system. For example, a sender communication node may be moved closer to one or more receiver communication nodes within a system, or a receiver communication node may be moved closer to one or more sender communication nodes within a system. The communication nodes to which the techniques described herein are applicable to include, but are not limited to, programs, processes, clients, servers, services, applications, modules, operating system entities, controlling domains or combinations of these and/or other such computer system entities. A communication node may be a computer system entity that may be configured to send and/or receive communications, data, requests and/or other such objects to and/or from other entities.

In particular, techniques are disclosed for utilizing processor capabilities to efficiently determine optimal, more optimal, less suboptimal and/or near-optimal placements of computer system communications nodes according to the locations of one or more client communications nodes. As used herein, unless otherwise stated or clear from context, the term "optimal" may be understood to mean better or improved and/or other such relative improvements of placement. In a specific example, the system may attempt to improve (e.g., optimize) the placement of services by reducing the number of network hops between the service and its clients, reducing average latency for requests, reducing reliance on congested networks and/or other such optimizations.

One or more network performance metrics may be used to measure the performance of values including, but not limited to, the number of network hops, latency, traffic on various routes, hardware efficiency or other such values. Such network performance metrics may be used to measure whether placing a client and/or the endpoint of a service in a new location results in an improvement. The services may include, for example, web services and/or other such services. The clients may include applications, modules, programs, systems and/or other such computer system entities capable of communicating with and/or connecting with the services.

In various embodiments, a distributed, virtualized and/or datacenter environment benefits from efficient placement of computer system services in order to improve communications between those computing system services and clients. This need for efficient placement, in various contexts, is increasingly true as the complexity of a system increases and where the system may, for example, include a large number of computer system services and/or clients, or a complex system architecture, or a large number of host systems, or a large number of datacenters, or widely distributed datacenters, or a large number of constraints on the interrelationships between services, or a complex variety of different types of, or a frequent number of service instantiations or a combination of these and/or other factors which may increase system complexity. This need for efficient placement may also increase as a system scales in scope and/or complexity.

In an illustrative example, consider a computer system that exposes a service via an endpoint of the service (such as, for example, a web service) and one or more clients that may connect to the service via the endpoint of that service. The endpoint of the service may have been instantiated in an arbitrary location or may have been instantiated in a location that was determined to be most efficient with respect to the clients at the time that the endpoint and/or the service was instantiated. Over time, as the clients that access the system change, the service may begin receiving the bulk of its communications from clients that are located in a different datacenter, city, state, country or continent. The client may begin to experience significant slowdowns and potential loss of availability of the service because, while the initial placement of the endpoint of the service may have been efficient, changes in the traffic patterns of the system may render such placement increasingly suboptimal. Long latencies in communications between the clients and an endpoint of a service caused by, for example, great physical (or logical) distance between the two or bandwidth limitations between the two may render the endpoint of the service and/or the service effectively useless. Physical distance may be based on, for example, geographical separation and/or length of network paths between clients and the endpoint of the service. Logical distance may be based on high latency and/or slow communications as a result of congested network traffic, slow network hardware, a large number network hops and/or other such network factors. Long latencies in communications between the clients and the endpoint of a service may result from physical distance, logical distance or a combination of these and/or other such factors.

Techniques disclosed herein include employing computer system resources to dynamically update the placement of services according to the changing location of clients within a host computing environment in a distributed, virtualized and/or datacenter computer environment. In some embodiments, a distributed and/or virtualized computer system may be spread across multiple locations or datacenters. Such datacenters may include multiple computer systems including, but not limited to, computer systems provided by a computing resource service provider and/or computer systems provided by a customer or user.

The endpoint of a service, such as a web service, can be configured to receive and/or respond to communications from one or more clients. The endpoint of a service may be initially placed in a physical and/or logical location within a computer system environment. The service, the endpoint of the service and/or another service running on the computer system may keep track of the one or more clients that communicate with the service and may also keep track of the physical and/or logical location of those clients. The physical and/or logical location of the clients may be as detailed as system needs require and may include, for example, geographical location such as a country, state or territory, city, neighborhood and so on, network address information, network routing information, datacenter location, location within a datacenter, location on a rack within a datacenter, location on a host machine within a rack, location on a virtual machine within a host machine and/or a combination of this and/or other such location information. As the service operates, the service, the endpoint of the service and/or another service running on the computer system may also observe and/or record traffic patterns between clients and the endpoint of the service.

In some embodiments, the service, the endpoint of the service and/or another service running on the computer system may observe and/or record traffic patterns between the clients and the service, or between the clients and one or more load balancers associated with the service, or between the load balancers and hosts of the service, or between the load balancers and virtual machines associated with the service. In some embodiments, where the clients may communicate directly with the hosts and/or the virtual machines, the service, the endpoint of the service and/or another service running on the computer system may observe and/or record traffic patterns between the clients and the hosts and/or virtual machines.

The observed and/or recorded traffic patterns may be used by the system to determine whether the endpoint of the service may be located in a suboptimal location with respect to one or more clients. Processes and/or services running on the computer system may determine that the endpoint of the service may be located in a suboptimal location by comparing the network latency or communications bandwidth between the client location and the location of the endpoint of the service to the network latency or communications bandwidth between the client location and one or more potential other locations for the endpoint of the service, or by comparing the physical (or logical) separation between the client location and the location of the endpoint of the service to the physical (or logical) separation between the client=location and one or more potential other locations for the endpoint of the service, or by comparing the network latency or communications bandwidth between the client location and the location of the endpoint of the service to the network latency or communications bandwidth between the client location and one or more potential other locations for the endpoint of the service or by a combination of these and/or other such comparisons.

Processes and/or services running on the computer system may use other metrics and measurements to determine whether a service may be located in a suboptimal location and may also use such other metrics to determine more optimal locations. For example, a service that relies on customer related content may receive connections from multiple customers in a variety of locations. Processes and/or services running on the computer system may split the service into multiple instances to place instances closer to customers that access the system frequently. Such a service that relies on customer related content may be also designed to cache customer related content for a customer that frequently accesses the service and so more customers accessing the service may require more cached customer related content, which may eventually lead to frequent swapping of the cached data. Processes and/or services running on the computer system may detect the swapping and/or the cache hits and determine that a service may be split into multiple instances, with each instance serving fewer customers and less cache data. The instances may then be moved even closer to the customer, thus further optimizing the placement.

In some embodiments, processes and/or services running on the computer system may model and/or simulate the existing system configuration and one or more other system configurations in order to determine whether an endpoint of a service is in a suboptimal location with respect to the client. For example, processes and/or services running on the computer system may use the observed and/or recorded traffic patterns between the endpoint of a service and the clients to determine one or more values that may represent a communications measure or metric between the services. The communications measure between the services may include latency values, available bandwidth, router and/or switch transitions, physical distance, logical distance, required bandwidth and/or other such values. Processes and/or services running on the computer system may use existing and/or new computer system services in the other potential locations to determine one or more values that may represent the communications measure between the client and an endpoint of a service located in those other potential locations. For example, processes and/or services running on the computer system may temporarily instantiate new services and/or new endpoints in other potential locations to handle some of the communications traffic from the clients and thus, to determine a communications measure between the clients and an endpoint of a service in the potential location. Processes and/or services running on the computer system may also temporarily instantiate new clients in other potential locations to determine a communications measure. Processes and/or services running on the computer system may also use other existing data to determine and/or estimate communications measure between the clients and the potential new locations.

Processes and/or services running on the computer system may use one or more objective functions such as fitness functions or utility functions to aid in the determination that the endpoint of a service may be located in a suboptimal location with respect to the client locations. An objective function, fitness function or utility function is a function to evaluate the fitness of a given solution for achieving a particular objective, in this case the objective of a more optimal placement of endpoints of services with respect to clients. An objective function will typically summarize several metrics into a single utility or fitness value which may, in some embodiments, be at least based at least in part on linear and/or weighted combination of those metrics. An objective function and the resulting fitness values may be used to measure whether a system is suboptimal, may also be used to determine whether proposed alterations to a system may improve a system by increasing one or more of the set of fitness values for proposed alterations to a system and may also be used to select a particular set of proposed solutions to maximize, either locally or globally, the fitness values for a system thus making it more optimal. Processes and/or services running on the computer system may use local and/or global optimization techniques to improve the optimality of the system. For example, services may use local optimizations algorithms such as hill-climbing algorithms to locally optimize themselves or processes and/or services running on the computer system may search for solutions that are more globally optimal based at least in part on multiple fitness values or the computer system may be configured to use a combination of optimization approaches.

Processes and/or services running on the computer system may include a variety of factors in determining whether the endpoint of a service may be in a suboptimal location and/or whether the client or the endpoint of a service may be moved to a more optimal location. The factors may include, but are not limited to, reduction in communications measures, freeing of computing system resources, potential location needs of other computer system services, difficulty in moving services, customer facing value and/or other such determining values. The migration (or relocation) to a more optimal location may include migration to the same country, region, datacenter, rack, host, controlling domain or virtual machine as resources allow. Processes and/or services running on the computer system and performing the evaluation of the optimality of a location may provide information regarding potentially more optimal locations to other processes or services, allowing such other processes and/or services to perform the migration of the services from the suboptimal location to the more optimal location. In some embodiments, processes and/or services running on the computer system may consider benefits of relocating a service and/or may also consider the costs associated with moving a service to determine whether a computer system service is located in a suboptimal location, to determine whether a more optimal location for the computer system service is available and/or to determine the most optimal and/or most improved location for the computer system service. Costs may include, but not be limited to, economic costs, complexity of completing the migration, damage to other services, systems, or customers, resource availability, reduced bandwidth, higher latency and other such costs.

In some embodiments, a customer may have some control over the weighting of factors in the consideration of the optimality of a service placement. For example, a service may normally be placed in a location which minimizes network latency, but such a placement strategy may mean that the service may gravitate toward locations with more bandwidth and more computing resources. In some embodiments, such more optimal locations may be more expensive for a customer in terms of other costs and so the customer may decide that these locations should be avoided. If the costs for certain locations fluctuate, a customer may elect to optimize based at least in part on lower costs rather than on greater benefits.

In the event that the computer system determines that the endpoint of a service may be placed in a more optimal location, processes and/or services running on the computer system may then begin relocating the endpoint of a service to the more optimal location. Processes and/or services running on the computer system may begin relocating the endpoint of a service to a more optimal location by instantiating a new server, or a new load balancer, or a new virtual machine on existing hardware in the more optimal location. Processes and/or services running on the computer system may use existing servers, load balancers or virtual machines in the more optimal location. A new service may then be instantiated in the new location and the clients of the previous service in the suboptimal location may be redirected to the new service. In some embodiments, where a computer system service is made up of a collection of services, only portions of the service may be migrated to the new location. For example, computer system services are frequently made up of front-end services that receive communications and one or more back-end services that process the communications. In such embodiments, processes and/or services running on the computer system may instantiate a new front-end service in the more optimal location and may keep the back-end services in the previous location. Processes and/or services running on the computer system may also instantiate a new front-end service in the more optimal location and may migrate one or more of the back-end services to that location or to another location close to the more optimal location. This partial migration approach may be used in embodiments where the more optimal location is heavily loaded and/or resource limited.

Once the new service is active in the more optimal location, processes and/or services running on the computer system may begin terminating one or more services that are in less optimal locations. Where multiple instances of a service are running within a computer system environment, processes and/or services running on the computer system may terminate the instance of the service that was determined to be running in a suboptimal location, or may terminate some other instance of the service that may also be running in a suboptimal, and/or potentially less optimal, location. In some embodiments, processes and/or services running on the computer system may determine that a service in a suboptimal location should not be immediately terminated if, for example, the service in the suboptimal location increases system redundancy. In such embodiments, the service instance in the suboptimal location may continue to be used (with reduced traffic) so that, in the event that one or more portions of the system experience failure the service instance in the suboptimal location may remain available to handle client requests. In such embodiments, the service instance in the suboptimal location may later become more optimal as communications patterns change. The service instance in the suboptimal location may also become even less optimal as communications patterns change and may, at that point, be terminated by the system.

As the evaluation and migration steps are performed for endpoints of services and/or clients throughout the system, clusters of endpoint of services will migrate towards clusters of clients. Processes and/or services running on the computer system may continue to evaluate and optimize the system based at least in part on traffic and/or usage patterns, migrating services to more optimal locations when the services are determined to be at suboptimal locations. The migration may be facilitated by, for example, splitting the services as described above and/or by creating new instances of services in new locations. For example, the endpoints of services with multiple client locations may be split into instances that are closest (physically or logically) to clients that they communicate with most frequently. Additionally, the services with multiple client locations may be split into instances and moved to locations that are closest (physically or logically) to clients that they communicate with most frequently or to endpoints of services that the communicate with most frequently. Load balancers may also be split into new load balancer instances to service local clusters of client and endpoints of services but with the ability to make calls to more remote (and thus less optimal) endpoints in the event of service saturation. As traffic patterns in the system change, so too may the locations of the instances of services in responses to those traffic patterns. For example, a retail store service may experience different client communications loads from different locations based upon the time of day, migrating around the globe with time changes. In such an example, the bulk of the retail store service instances may migrate around the globe with the increased client communications loads.

In order to constrain the volatility of the system and to prevent services chasing their clients around the system, processes and/or services running on the computer system may limit migrations of services, or may only perform the evaluation and migration at a certain interval, or may limit some services from moving or may perform one or more other such limiting functions. For example, some constraint parameters may be implemented which may restrict migration beyond a certain point. Such migration constraint parameters may be incorporated in the objective function computation for migration, increasing the costs associated with migrating a system beyond a certain point. Constraint parameters may also be used to retain redundant instances of services as described above. Using such constraint parameters to retain redundancy may allow the migration of a majority of service instances to more optimal locations while keeping some available service instances at less optimal, distance locations. Such constraints may balance improved communications with system redundancy.

FIG. 1 illustrates an example environment 100 where a service may be migrated to a more optimal location based at least in part on the location of one or more clients running on one or more computer systems within a computer system environment as well as the associated code running thereon, in accordance with at least one embodiment. A user 102 may connect 106 to a computer system through a computer system client device 104 and may initiate a connection 122 between one or more clients 120 and one or more services 114 running within a computing resource service provider 110 such as a distributed, virtualized and/or datacenter environment. In some embodiments, the user 102 may be a person, or may be a process running on one or more remote computer systems, or may be some other computer system entity, user or process. The command or commands to connect to the computer system and/or to connect the services may originate from an outside computer system and/or server, or may originate from an entity, user or process on a remote network location, or may originate from an entity, user or process within the computer system, or may originate from a user of the computer system client device 104, or may originate as a result of an automatic process or may originate as a result of a combination of these and/or other such originating entities. In some embodiments, the command or commands to initiate the connection 122 between the client 120 and the service may be initiated by the computer system, without the intervention of a user 102. The command or commands to initiate a connection between the services may originate from the same origin as the command or commands to connect to the computer system or may originate from a different outside computer system and/or server, or may originate from a different entity, user or process on the same or a different remote network location, or may originate from a different entity, user or process within the computer system, or may originate from a different user of a computer system client device 104, or may originate as a result of a combination of these and/or other such same and/or different entities.

The user 102 may request connection to one or more host computer systems via one or more connections 106 and, in some embodiments, via one or more networks 108 and/or entities associated therewith, such as servers connected to the network, either directly or indirectly. The computer system client device 104 that may request access to the host computer system may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

After the one or more clients 120 running within a datacenter 118 within a computing resource service provider 110 have established a connection 122 with one or more services 114 running within a datacenter 112 within the computing resource service provider 110, processes and/or services running on the computer system may begin monitoring the connection 126 using, in some embodiments, a connection monitor 124. The connection monitor 124 may observe and record connection traffic between the clients 120 and the services 114 and may use this connection traffic to determine one or more connection measurements. The one or more connection measurements may be used to determine whether the services 114 should be migrated 116 from the datacenter 112 to a location within the datacenter 118 based at least in part on whether the computer system determines that the connection 122 would be more efficient as a result of the migration. In some embodiments, processes and/or services running on the computer system may also migrate the one or more services 114 to a datacenter other than datacenter 118, but one that provides a better connection between the services than the location within datacenter 118.

Processes and/or services running on the computer system may determine that the migration to a different data center would improve the efficiency of the communication between the services based at least in part on, for example, improved network latency, or fewer network hops, or a closer physical and/or logical location, or improved bandwidth or on a combination of these and/or other such factors. Processes and/or services running on the computer system may use one or more objective functions to determine whether the migration 116 may result in improved, more efficient and/or more optimal communications between the services and may, in some embodiments, include additional factors in the evaluation. The factors may include, but are not limited to, costs to migrate the services, the business value of the services, the nature of the clients of the services, the economic value of the services, the economic value of the resources associated with the services or a combination of these and/or other such considerations.

Figure 2:
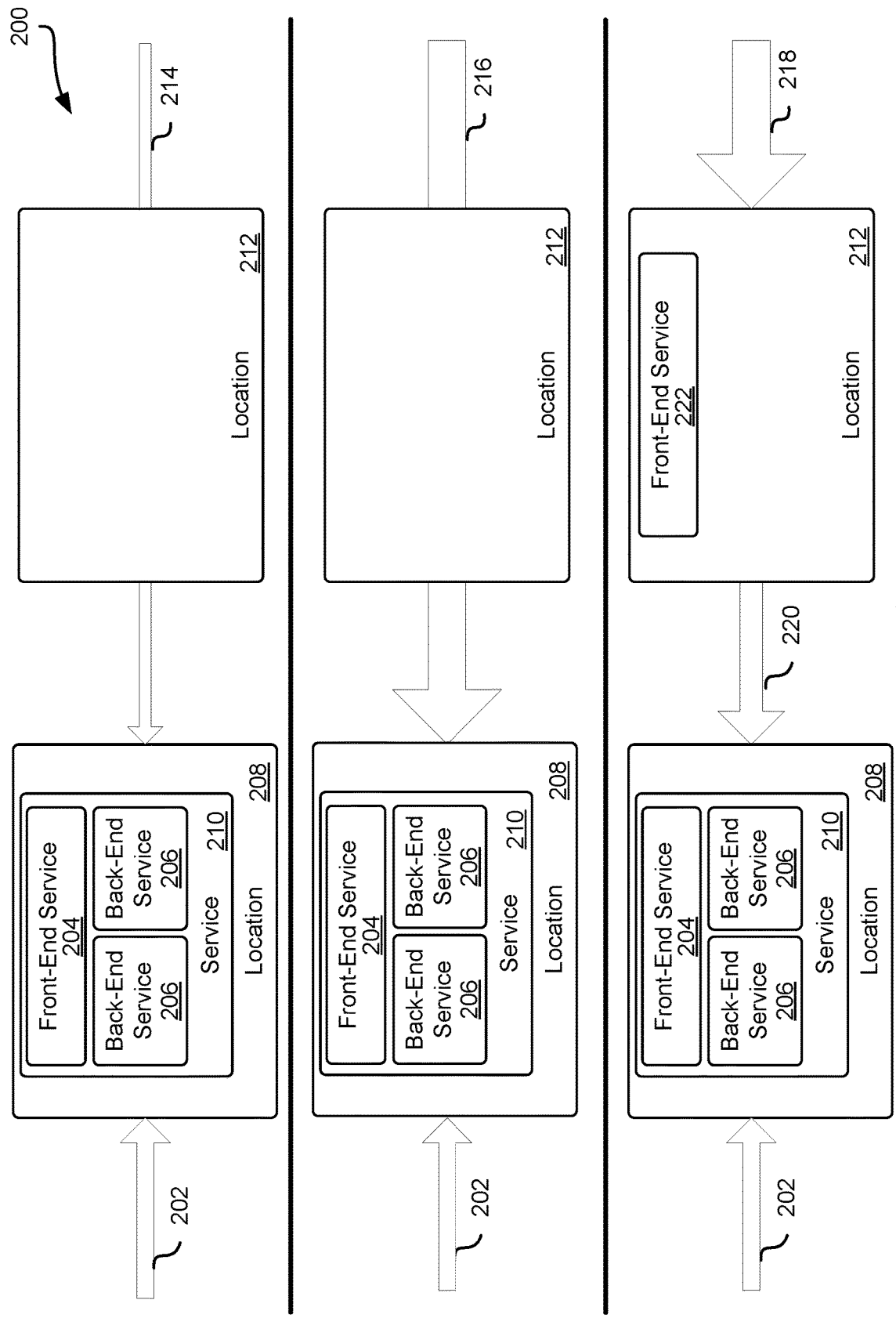
FIG. 2 illustrates an example environment where services may be partially moved to more improved locations as a result of increasing demand from clients in accordance with at least one embodiment.

FIG. 2 illustrates an example environment 200 where a service may be fully or partially migrated from one location to another location as a result of changes in traffic patterns as described herein at least in connection with FIG. 1 and in accordance with at least one embodiment. Initially, a service 210 which has a front-end service 204 for receiving requests and one or more back-end services 206 for processing those requests may be running in a location 208. The location 208 may be defined by a region, or a datacenter, or a rack, or a host, or a virtual machine and/or by some other such location definition. Initially, the service may have traffic from clients 202 that are in close physical and/or logical proximity to the location 208 and may also have moderate traffic from clients 214 that are in close physical and/or logical proximity to a different location 212.

Processes and/or services running on the computer system may monitor the traffic from clients as described herein at least in connection with FIG. 1 and in accordance with at least one embodiment and may, after a change in client needs, detect a significant increase in traffic from clients 216 that are in close physical and/or logical proximity to the location 212. As a result of detecting a change in traffic patterns, processes and/or services running on the computer system may attempt to move part of the service 210 to location 212 in order to improve efficiency of the system by optimizing the placement of the services based at least in part on the changed traffic patterns. With, for example, a second instantiation of a front-end service 222 in location 212, the traffic from clients 218 may be more efficiently received at location 212 with the traffic to the back-end services 220 being forwarded to location 208 for processing by back-end services 206.

Figure 3:
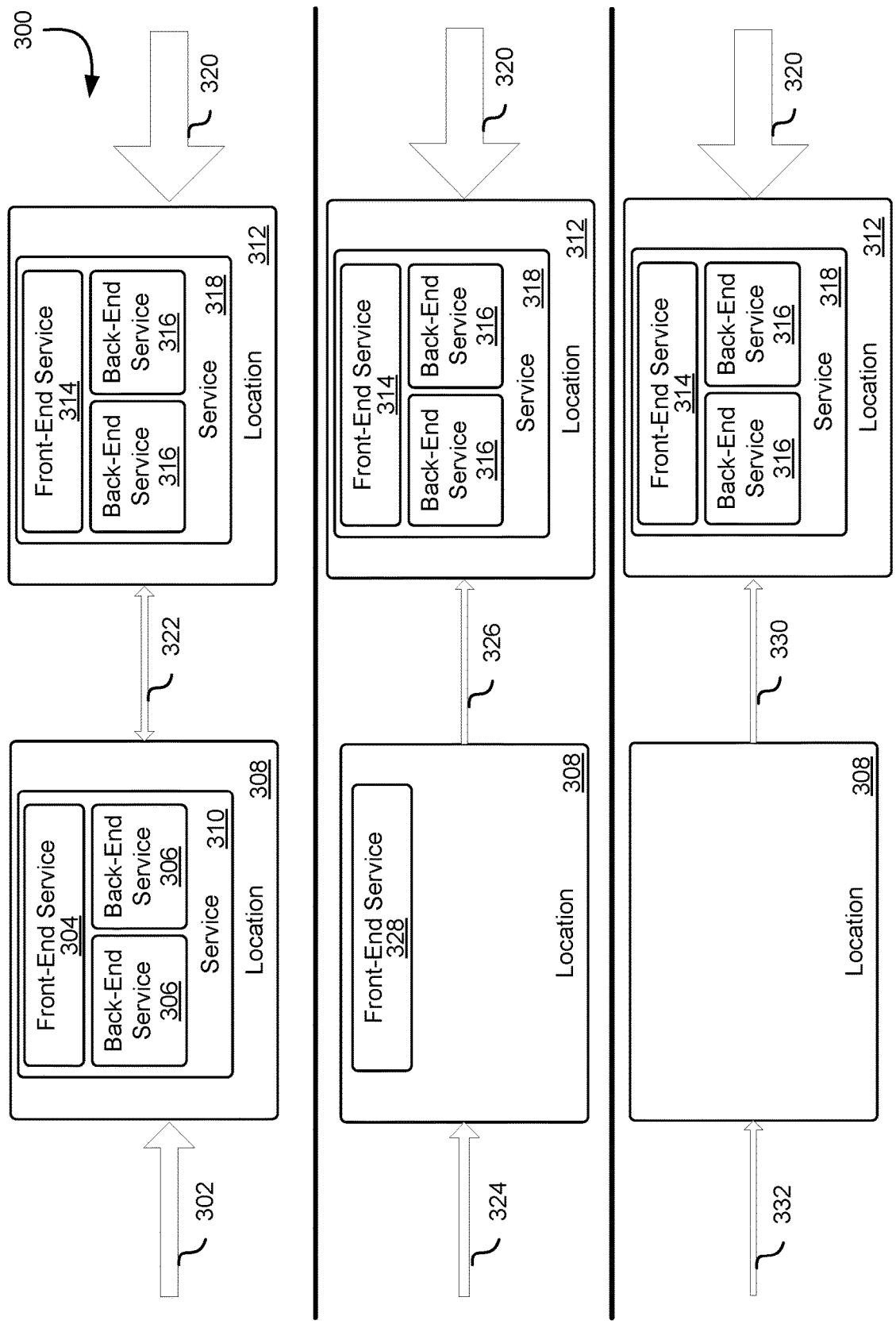
FIG. 3 illustrates an example environment where services may be partially or completely moved to more improved locations based at least in part on client locations and demand from clients in accordance with at least one embodiment.

FIG. 3 illustrates an example environment 300 where a service may be fully or partially migrated from one location to another location as a result of changes in traffic patterns as described herein at least in connection with FIGS. 1 and 2 and in accordance with at least one embodiment. The environment illustrated in FIG. 3 is a continuation of the environment illustrated in FIG. 2 and illustrates further service placement optimization based at least in part on a physical and/or logical proximity to clients.

The second instantiation of a front-end service 222 in location 212 illustrated in FIG. 2 resulted in a reduction of traffic to the back-end services 220 between location 212 and location 208, but still resulted in a large amount of traffic. Based at least in part on the amount of traffic remaining, processes and/or services running on the computer system may further optimize the placement of services by, for example, completely migrating the service. FIG. 3 illustrates a system where a service 310 consisting of a front-end service 304 and one or more back-end services 306 originally in location 308 may be duplicated and migrated to a service 318 consisting of a front-end service 314 and one or more back-end services 316 in location 312. With such a migration, service 310 in location 308 may continue to service traffic from clients 302 that are in close physical and/or logical proximity to location 308 and service 318 in location 312 may service traffic from clients 320 that are in close physical and/or logical proximity to location 312. In some embodiments, a connection 322 between service 310 in location 308 and service 318 in location 312 may be maintained so that, for example, if traffic from clients 302 increases, front-end service 304 in location 308 may use back-end services 316 in location 312 to help handle some of the increased traffic.

Processes and/or services running on the computer system may continue to optimize the placement of services based at least in part on observed traffic patterns between services and/or other changes in system configuration, architecture, resource loading, business value and/or other such factors. For example, if traffic from clients 302 decreases to a lower value of traffic from clients 324, processes and/or services running on the computer system may determine that back-end services 306 are no longer required and may choose to only leave front-end service 328 at location 308 and forward 326 processing of requests received at front-end service 328 in location 308 to back-end services 316 in location 312, thus freeing up resources in location 308. Similarly, a further reduction in traffic from clients 332 may cause the system to eliminate front-end service 328 in location 308 and forward 330 all client requests from location 308 to service 318 in location 312. Note that at some point in the future, the traffic patterns may change and the services may be migrated to these and/or other more optimal locations. For example, the traffic from clients 332 may dramatically increase and/or the traffic from clients 320 may dramatically decrease, causing the system to migrate some or all of the service 318 back to location 308. Similarly, traffic may increase from other locations, causing the system to migrate some or all of the service 318 to locations more proximal to those clients.

The migration of endpoints of services based on moving them partially and/or fully to locations that are more proximal to the clients as illustrated in FIGS. 2 and 3 is merely one embodiment of how services may be located and/or relocated. For example, in some embodiments it may be more efficient to relocate the clients to be in closer proximity to the services rather than migrating the services to be in closer proximity to the clients. If a client is free to migrate, and if that client is relatively simple to move, and if a service is relatively complex to move, then it may be considerably more efficient to migrate the client to a location that is more proximal to the service location. Similarly, in some embodiments, it may be more efficient to move both the clients and the services to an intermediate location between the two if, for example, there is a location between the two that is lightly loaded and with available resources. As may be contemplated, these approaches to migrate the clients, the services and/or portions of one and/or both are merely illustrative examples and other migration approaches may be considered as within the scope of the present disclosure.

Figure 4:
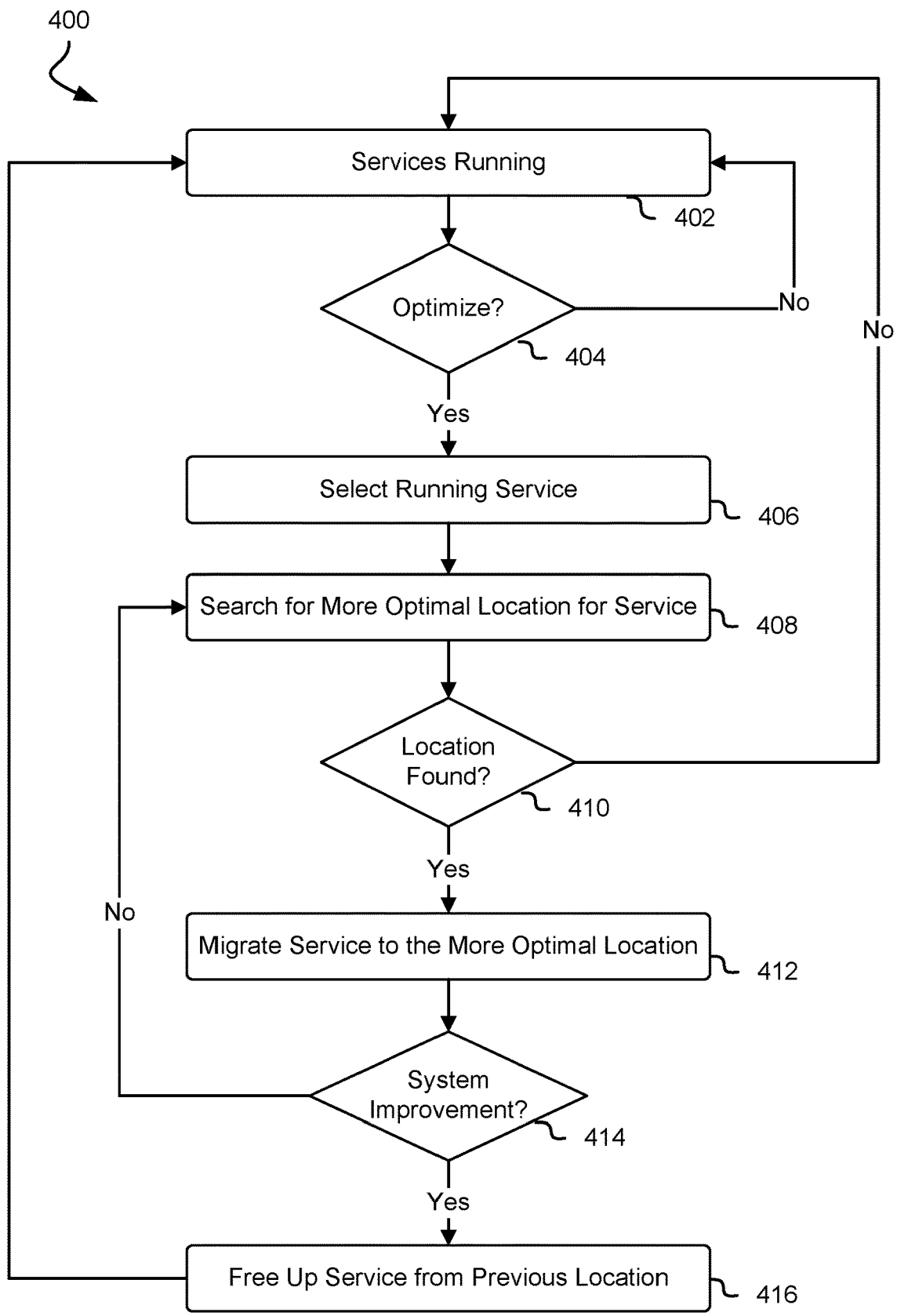
FIG. 4 illustrates an example process for determining more improved locations for services in accordance with at least one embodiment.

FIG. 4 illustrates an example process 400 for migrating services to more optimal locations within a computer system based at least in part on observed traffic patterns and/or other factors as described at least in connection with FIG. 1 and in accordance with at least one embodiment. A service such as the service 114 illustrated at least in connection with FIG. 1 may perform some or all parts of the process illustrated in FIG. 4. A monitor such as connection monitor 124 illustrated at least in connection with FIG. 1 may also perform some or all parts of the process illustrated in FIG. 4. Other services and/or processes running on a computer system may also perform some or all parts of the process illustrated in FIG. 4 including, but not limited to, applications, processes and/or services running on host and/or virtual machines within the computer system, operating system elements of host and/or virtual machines within the computer system, dedicated network hardware on the computer system, controlling domains such as a hypervisor and/or combinations of these and/or other such operational entities within the computer system.

In a system with services running 402, one or more operational entities such as the operational entities described herein may determine whether the system should optimize 404 the placement of one or more services running within the system. The determination to optimize the placement of one or more services running within the system may be made as a result of observed network patterns, or may occur on a periodic basis, or may be made based upon a system alarm and/or some other system threshold event, or may be made according to one or more system policies, or may be initiated by an operator, user or customer of the system or may occur based on a combination of these and/or other such determining factors. If it is determined that the placement of one or more services running within the system should be optimized, then one or more running services may be selected for optimization 406. A running service may be selected for optimization 406 based at least in part on network traffic patterns, or on system policy, or on customer value, or on the business value of the service, or on resource demands or on a combination of these and/or other such factors.

Once a running service is selected for optimization 406, one or more operational entities such as the operational entities described herein may begin to search for a more optimal location for the service 408 within the computer system. As mentioned herein, the search for a more optimal location for the service 408 may be made based at least in part on a number of determining factors. The determining factors may include, but are not limited to, a closer physical and/or logical proximity to one or more clients, availability of resources in the previous and/or proposed locations, costs to move services, system policies, business value of the services and/or other such factors. If a potentially more optimal location is found 410, processes and/or services running on the computer system may begin to migrate the service to the more optimal location 412. If a potentially more optimal location is not found, processes and/or services running on the computer system may elect to exit the process and wait until the next optimization iteration when traffic patterns may have changed further and/or when other services may have migrated to different locations, thus freeing up resources.

In some embodiments, processes and/or services running on the computer system may migrate the service to the more optimal location 412 immediately upon locating the potentially more optimal location. Processes and/or services running on the computer system may also delay migrating the service to the more optimal location until further locations have been evaluated as potentially even more optimal. Processes and/or services running on the computer system may also migrate a portion of the service to the more optimal location to test whether the new location improves system efficiency. Processes and/or services running on the computer system may also instantiate a test service at the new location to further evaluate traffic patterns. For example, processes and/or services running on the computer system may instantiate a portion of the service such as, for example, a front-end service as described herein at least in connection with FIG. 2 and in accordance with at least one embodiment which may be instrumented to monitor traffic in order to aid in evaluating whether the proposed migration improves system efficiency. In some embodiments, the migration of the service to the new location may involve instantiating a new copy of the service and/or removing the old service, or may involve instantiating a portion of the new service and/or removing a corresponding portion of the old service, or may involve instantiating a new full and/or partial copy of the service while not altering the old service or may involve a combination of these and/or other migration approaches.

After the system at least partially migrates the service to the more optimal location 412, processes and/or services running on the computer system may perform one or more operations to evaluate if the migration has resulted in a system improvement 414. The one or more operations may include, but are not limited to, evaluating measurements of network latency, bandwidth and/or other network communications measures and comparing the new measurements to previously made measurements. If the system is determined to be locally and/or globally more efficient, processes and/or services running on the computer system may in some embodiments complete any required removal of the old service by, for example, freeing up the service from the previous location 416. The decision to free up the service from the previous location 416 may be made based at least in part on resource demands, bandwidth requirements, system policies, customer facing value, business value and/or other such factors. For example, processes and/or services running on the computer system may not free up the service from the previous location 416 if it is determined that there are adequate resources to support the service in both locations, or if it is determined that the previous system should remain functional for redundancy reasons, or if it is determined that the service may be required in the near future due to anticipated traffic changes or for combinations of these and/or other such reasons. In the event that the system finds that it is not the case that the migration has resulted in a system improvement 414, processes and/or services running on the computer system may undo the move and once again search for a more optimal location for the service 408.

Figure 5:
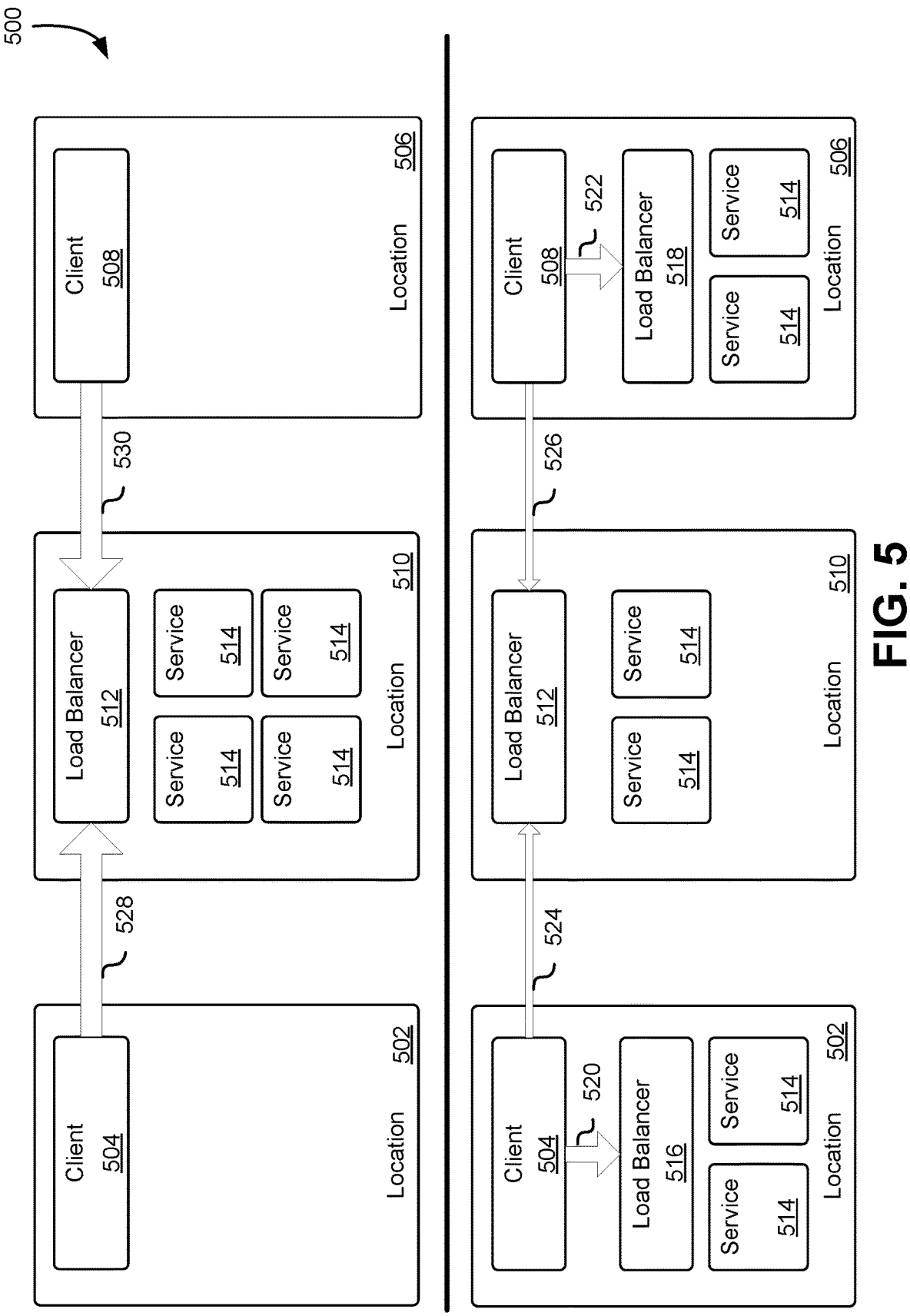
FIG. 5 illustrates an example environment where load balanced services may be split between locations and relocated in accordance with at least one embodiment.

FIG. 5 illustrates an example environment 500 where a service may be migrated to multiple locations that may be more optimal based at least in part on physical and/or logical proximity to one or more clients as described herein at least in connection with FIG. 1 and in accordance with at least one embodiment. Initially, a service 514 which may have multiple instances under the control of a load balancer 512, all of which may be running in location 510, may be receiving incoming traffic 528 from a client 504 located in location 502 and may also be receiving incoming traffic 530 from a client 508 located in location 506. The location 502, location 506 and location 510 may be different locations in different countries, regions, datacenters, racks, hosts, virtual machines and/or other such disparate locations. As a result of detecting the traffic from other locations, processes and/or services running on the computer system may determine that at least a portion of the functionality provided by service 514 in location 510 may be more optimally provided by services located more proximally to location 502 and location 506. Processes and/or services running on the computer system may determine that other more optimal locations may exist by using processes and techniques as described herein at least in connection with FIG. 1 and in accordance with at least one embodiment.

As a result of determining that it may be more optimal to locate at least a portion of the functionality provided by service 514, processes and/or services running on the computer system may instantiate a load balancer 516 at, or in close physical and/or logical proximity to, location 502 and may also instantiate one or more instances of service 514 under control of load balancer 516 at, or in close physical and/or logical proximity to, location 502. Processes and/or services running on the computer system may also instantiate a load balancer 518 at, or in close physical and/or logical proximity to, location 506 and may also instantiate one or more instances of service 514 under control of load balancer 518 at, or in close physical and/or logical proximity to, location 506. In some embodiments, processes and/or services running on the computer system may remove load balancer 512 and the instances of service 514 at location 510 as a result of migrating services to location 502 and location 506. In some embodiments, processes and/or services running on the computer system may retain load balancer 512 and/or one or more instances of service 514 at location 510 in order to, for example, maintain system redundancy. With a load balancer 516 and instances of service 514 located at, or in close physical and/or logical proximity to, location 502 the bulk of the communications between client 504 and service 514 may go through the efficient link 520, while any overflows may be routed back to load balancer 512 at location 510 through the less efficient link 524. Similarly, the bulk of the communications between client 508 and service 514 may go through the efficient link 523, while any overflows may be routed back to load balancer 512 at location 510 through the less efficient link 526.

Figure 6:
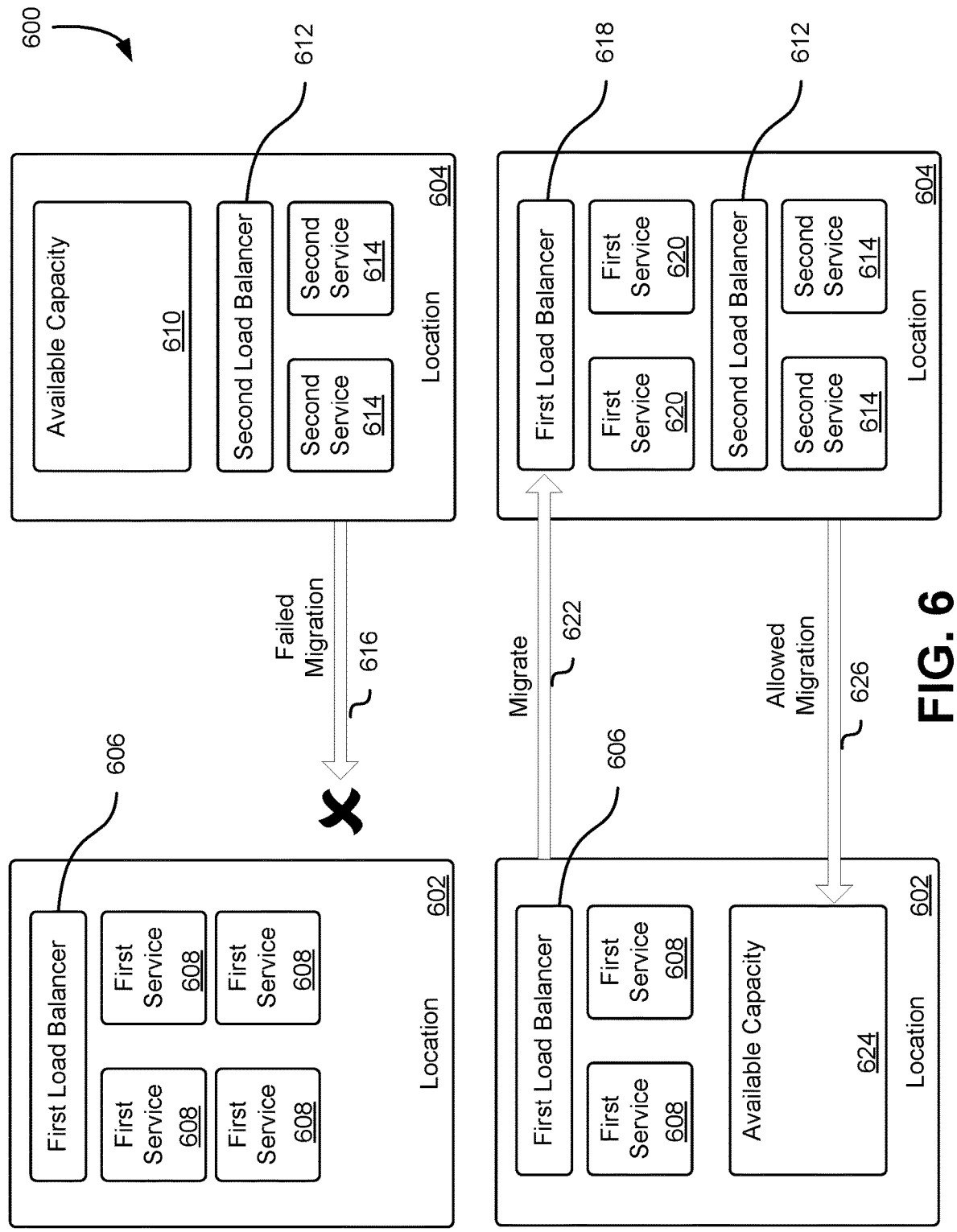
FIG. 6 illustrates an example environment where capacity in improved locations may be reclaimed in accordance with at least one embodiment.

FIG. 6 illustrates an example environment 600 where a proposed migration from a less optimal location to a more optimal location may be accomplished by performing one or more operations to reclaim resources such as by performing a service migration as described herein at least in connection with FIG. 1 and in accordance with at least one embodiment. A first load balancer 606 with one or more first services 608 may be running at location 602 with no available capacity and/or resources available to allow migration of other services to that location. The location 602 may not have any available capacity due to limitations on storage, or processing power, or network bandwidth, or CPU cycles, or the availability of required hardware and/or other such limitations. Processes and/or services running on the computer system may determine that location 602 is a more optimal location to place an instance of a load balancer 612 and/or one or more instances of a second service 614 based at least in part on, for example, location 602 being more physically and/or logically proximal to services that must communicate with second service 614 than location 604 is, as described herein at least in connection with FIG. 1 and in accordance with at least one embodiment. An attempt by the system to migrate the load balancer 612 and/or one or more instances of a second service 614 from location 604 to location 602 may result in a failed migration 616 because of the lack of available capacity at location 602.

In some embodiments, processes and/or services running on the computer system may attempt to mitigate the failed migration 616 by moving one or more entities from location 602 to another location. For example, processes and/or services running on the computer system may determine that there is available capacity 610 at location 604 and may migrate 622 an instance of first load balancer 606 at location 602 to first load balancer 618 at location 604 using available capacity 610 and/or may also migrate one or more instances of first service 608 at location 602 to one or more instances of first service 620 at location 604 using available capacity 610. The migration of services from location 602 to location 604 may create available capacity 624 at location 602, thereby allowing the migration 626 to succeed. As may be contemplated, processes and/or services running on the computer system may undertake other mitigating strategies in addition to the strategy of swapping services between locations as illustrated in FIG. 6. For example, processes and/or services running on the computer system may migrate one or more services from location 602 to a different, and potentially more optimal, third location. Processes and/or services running on the computer system may also migrate clients and services to a new location, thereby creating available capacity. In some embodiments, processes and/or services running on the computer system may instantiate new locations such as, for example, creating new virtual machines or bringing new hardware online, thereby increasing available capacity in a location.

Figure 7:
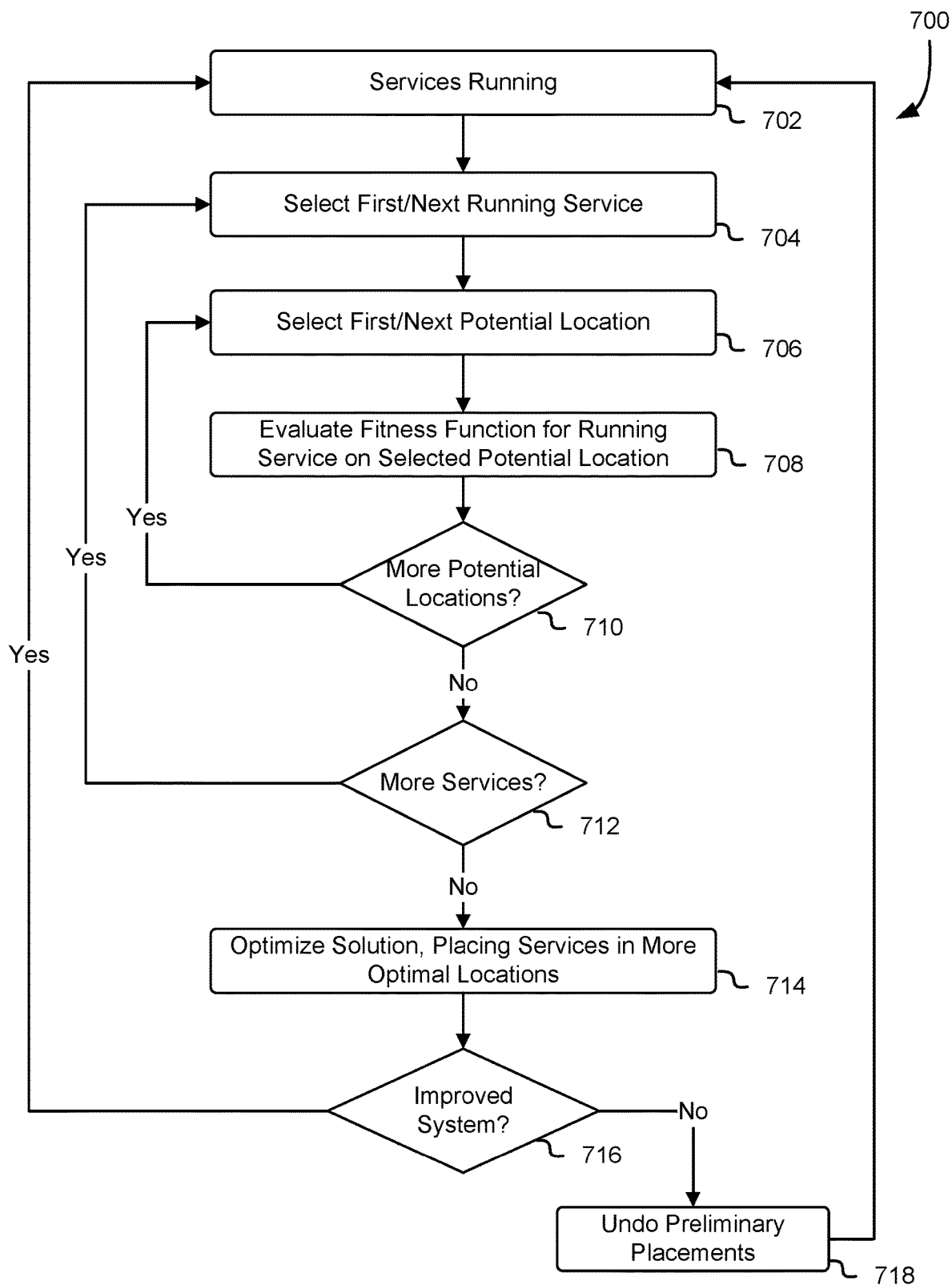
FIG. 7 illustrates an example process for improving system efficiency by moving services to more improved locations in accordance with at least one embodiment.

FIG. 7 illustrates an example process 700 for using an objective function to determine efficient migration of services to more optimal locations within a computer system as described at least in connection with FIG. 1 and in accordance with at least one embodiment. A service such as the service 114 illustrated at least in connection with FIG. 1 may perform some or all parts of the process illustrated in FIG. 7. A monitor such as connection monitor 124 illustrated at least in connection with FIG. 1 may also perform some or all parts of the process illustrated in FIG. 7. Other services and/or processes running on a computer system may also perform some or all parts of the process illustrated in FIG. 7 including, but not limited to, applications, processes and/or services running on host and/or virtual machines within the computer system, operating system elements of host and/or virtual machines within the computer system, dedicated network hardware on the computer system, controlling domains such as a hypervisor and/or combinations of these and/or other such operational entities within the computer system.

In a system with services running 702, one or more operational entities such as the operational entities described herein may determine whether the system should optimize the placement of one or more services running within the system as described herein at least in connection with FIG. 4 and in accordance with at least one embodiment. If the placement of one or more services should be optimized, processes and/or services running on the computer system may first select a running service 704. Processes and/or services running on the computer system may then select one or more potential locations 706 that the service may be migrated to. Processes and/or services running on the computer system may then examine the selected location and may determine 708 whether the selected location is a more optimal location for the service based at least in part on an objective function such as a fitness function or a utility function which may, for example, aggregate measurements of one or more system, network, computation, business and/or economic values into a single weighted value. In some embodiments, each potential location may have a fitness value associated with it for a particular service to migrate to. Processes and/or services running on the computer system may cycle through the potential locations, determining whether there are more potential locations 710 and/or more available services 712 until all of the locations and/or services have been examined, or until a certain threshold number of locations and/or services have been examined, or until a certain number of more optimal locations have been found for a particular service or until some other system determined condition has been met.

In some embodiments, as described herein at least in connection with FIG. 4 and in accordance with at least one embodiment, processes and/or services running on the computer system may engage in local optimizations, migrating services to more optimal locations when those more optimal locations are found. In some embodiments, processes and/or services running on the computer system may instead engage in a more global optimization approach, first gathering a set of more optimal locations for one or more running services and then endeavoring to perform migrations for all services in a more globally optimal manner. In such embodiments, the global optimization factors may be included in the objective function analysis. In some embodiments, the global optimization may be performed as a separate step. In some embodiments, the global optimization may be performed by simulating and/or modeling the altered system. In some embodiments, the global optimization may be performed by placing the services in the more optimal locations 714 and then determining whether the system is improved 716. In such embodiments, if the system is not improved, processes and/or services running on the computer system may undo the placements 718 before beginning the process anew. As may be contemplated, the methods of performing global optimization of the service placements described herein are merely illustrative examples and other methods of performing a global optimization of the service placements may be considered as within the scope of the present disclosure.

Figure 8:
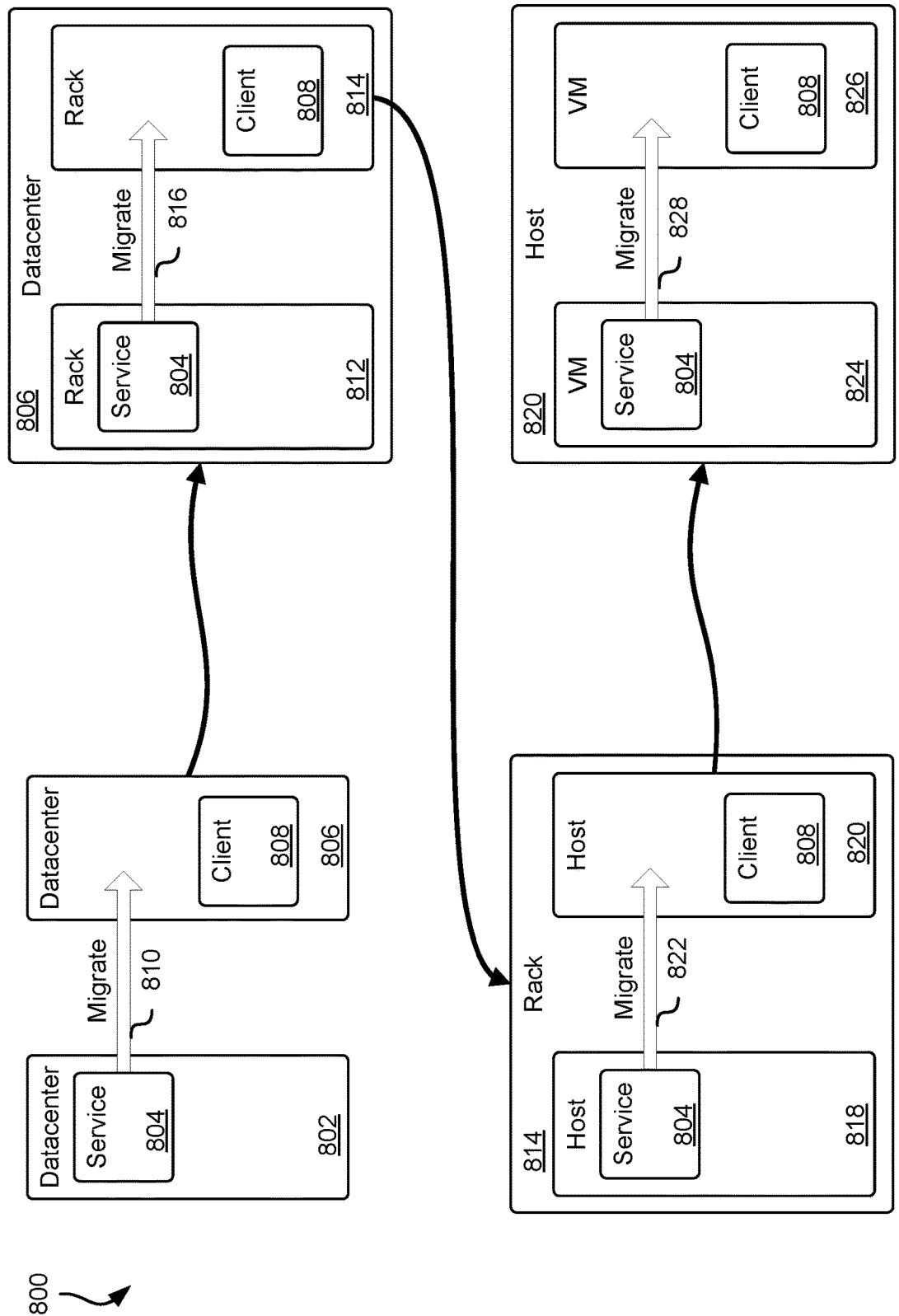
FIG. 8 illustrates an example environment where increasingly improved locations are chosen for a service based at least in part on the client location in accordance with at least one embodiment.

FIG. 8 illustrates an example environment 800 where increasingly optimal placement locations may be selected for a service based at least in part on a client location as described herein at least in connection with FIG. 1 and in accordance with at least one embodiment. When a service 804 is located in a datacenter 802 and the client 808 is located in a datacenter 806, processes and/or services running on the computer system may migrate 810 the service from datacenter 802 to datacenter 806. Further attempts to optimize the placement of the service may involve migrating 816 the service from rack 812 in datacenter 806 to the rack 814 in datacenter 806 where the client is located, migrating 822 the service from host 818 on rack 814 to host 820 on rack 814 where the client is located and/or migrating 828 the service from virtual machine (or virtual machine controlling domain) 824 on host 820 to a virtual machine (or virtual machine controlling domain) 826 where the client is located. A migration of a service onto the same host, virtual machine controlling domain (such as a hypervisor) or virtual machine as the client may allow the reconfiguration of all communications between the client and the service to be via extremely low-latency communications protocols such as shared memory, shared files, sockets, pipes and/or other such direct communications modes. As may be contemplated, the migrations described herein are examples of migrations that may be performed to optimize the placement of a service with respect to one or more clients. Other migrations may be performed by, for example, migrating the clients, migrating both the clients and the services, or migrating portions of services or other such migrations.

Figure 9:
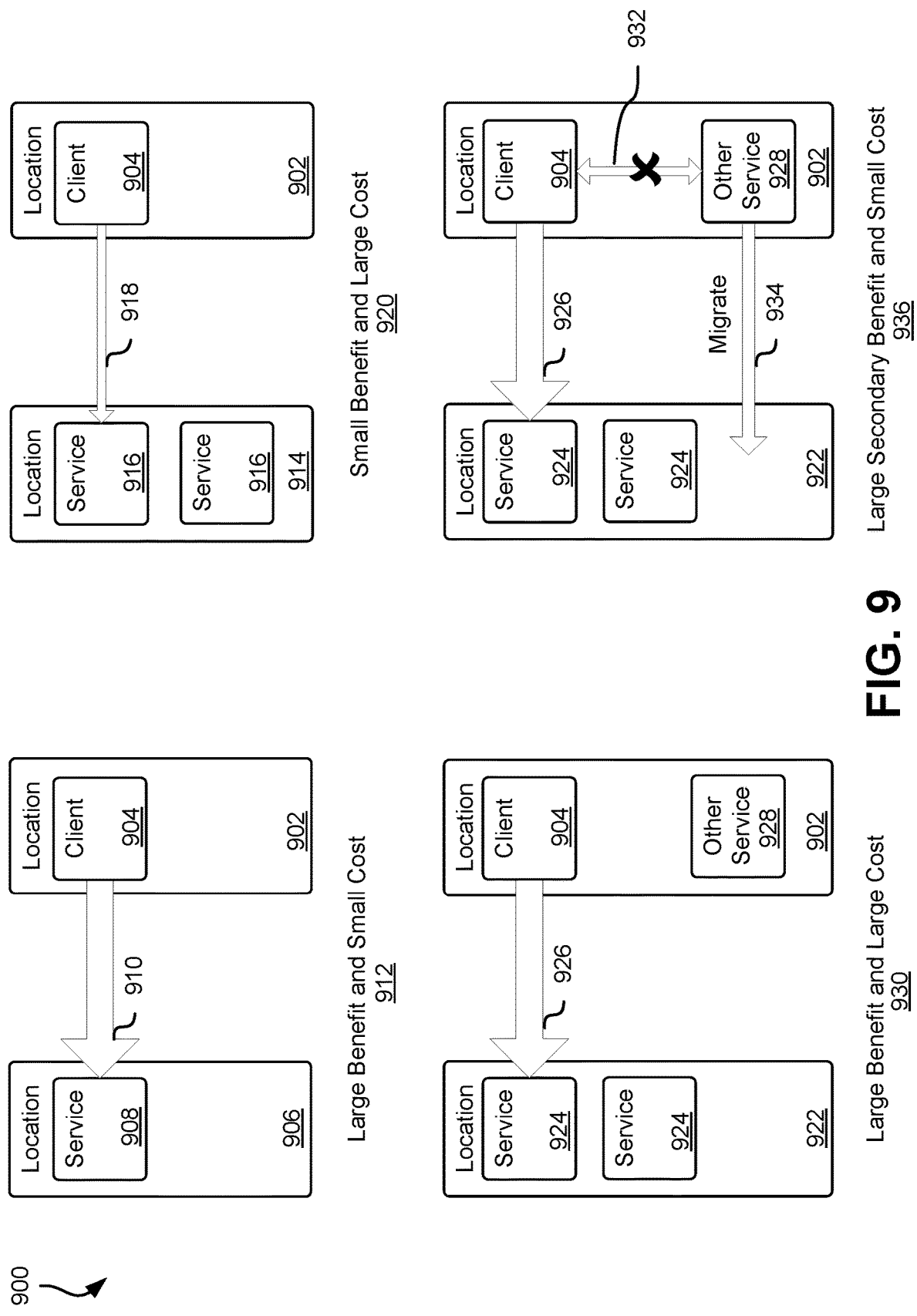
FIG. 9 illustrates an example environment the costs and benefits of migrating services to more improved locations based at least in part on client location are evaluated in accordance with at least one embodiment.

FIG. 9 illustrates an example environment 900 where the costs and benefits of migrating services to more optimal locations based at least in part on client location are evaluated as described herein at least in connection with FIG. 1 and in accordance with at least one embodiment. A simple service 908 in location 906 with a large amount of traffic 910 from a client 904 in location 902 may have a large benefit and a small cost 912 because the service 908 may be easy to move and because the high traffic 910 between client 904 and service 908 may be more efficient if the services were in the same location. Such a migration with large benefit and small cost 912 may be a good candidate for optimization by migrating service 908 from location 906 to location 902. A more complex service 916 with, for example, a plurality of service instances in location 914 and with a small amount of traffic 918 between client 904 in location 902 and service 916 may have a small benefit and a large cost 920 because of the difficulty of moving the service 916 and the comparatively small amount of traffic. Such a migration may not be a good candidate for optimization.

Migrations with a large disparity between the costs and benefits such as a migration with large benefit and small cost 912 or a migration with a small benefit and a large cost 920 may be easy to evaluate, but migrations with a smaller disparity between the costs and the benefits may be more difficult to evaluate. For example, a more complex service 924 in location 922 with a large amount of traffic 926 between client 904 in location 902 and service 924 in location 922 may have a large benefit and a large cost 930. Migrating the service 924 to location 902 may be made more costly due to limited resource availability in location 902 due to, for example, the presence of other service 928. However, with no communications dependency between client 904 and other service 928, there may be a large secondary benefit and small cost 936 to migrating 934 other service 928 from location 902 to location 922, said secondary benefit being the reduction in the cost to migrate service 924 from location 922 to location 902.

Figure 10:
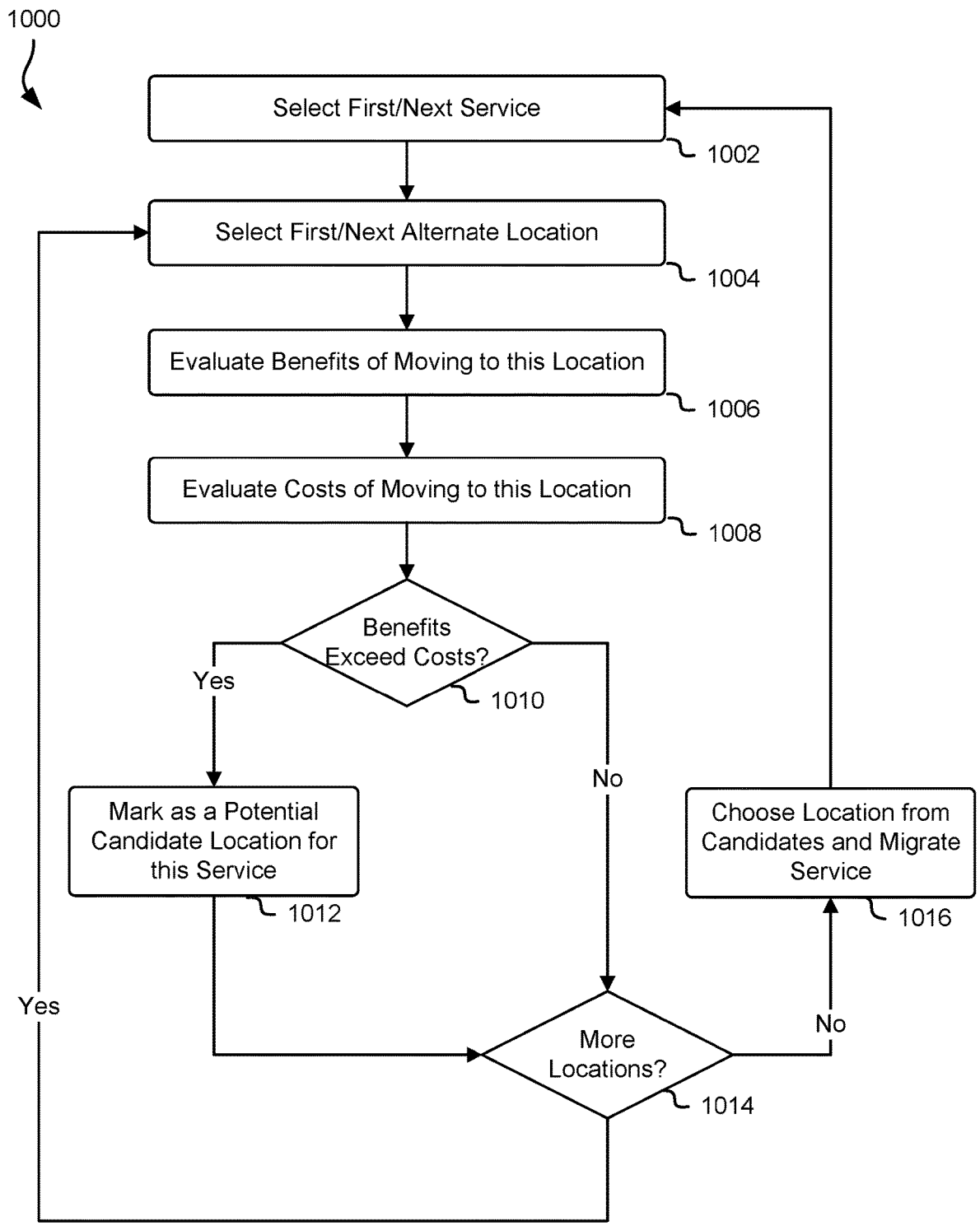
FIG. 10 illustrates an example process for evaluating cost and benefits of migrating services in accordance with at least one embodiment.

FIG. 10 illustrates an example process 1000 for evaluating the costs and benefits of migrating services between locations as described herein at least in connection with FIGS. 1 and 9 and in accordance with at least one embodiment. A service such as the service 114 illustrated at least in connection with FIG. 1 may perform some or all parts of the process illustrated in FIG. 10. A monitor such as connection monitor 124 illustrated at least in connection with FIG. 1 may also perform some or all parts of the process illustrated in FIG. 10. Other services and/or processes running on a computer system may also perform some or all parts of the process illustrated in FIG. 10 including, but not limited to, applications, processes and/or services running on host and/or virtual machines within the computer system, operating system elements of host and/or virtual machines within the computer system, dedicated network hardware on the computer system, controlling domains such as a hypervisor and/or combinations of these and/or other such operational entities within the computer system.

One or more services may be selected 1002 and one or more alternate locations for those services may be selected 1004. For each location, processes and/or services running on the computer system may evaluate the benefits 1006 of moving to the location based at least in part on, for example, improved communications, better bandwidth, freeing resources, better customer experience and/or other such benefits. For each location, processes and/or services running on the computer system may also evaluate the costs 1008 of moving to the location based at least in part on, for example, the difficulty of moving the system, limitations on resources at the destination, worsened customer experience and/or other such costs. In the event that the benefits exceed the costs 1010, processes and/or services running on the computer system may mark the location as a potential candidate location for the service 1012 before determining whether there are more potential locations 1014 that should be evaluated. When there are no more locations, processes and/or services running on the computer system may choose a location from the candidate location and migrate the service there 1016. Processes and/or services running on the computer system may also delay the migration based at least in part on a decision to perform a more global optimization such as the optimization described herein at least in connection with FIG. 7 and in accordance with at least one embodiment.

Figure 11:
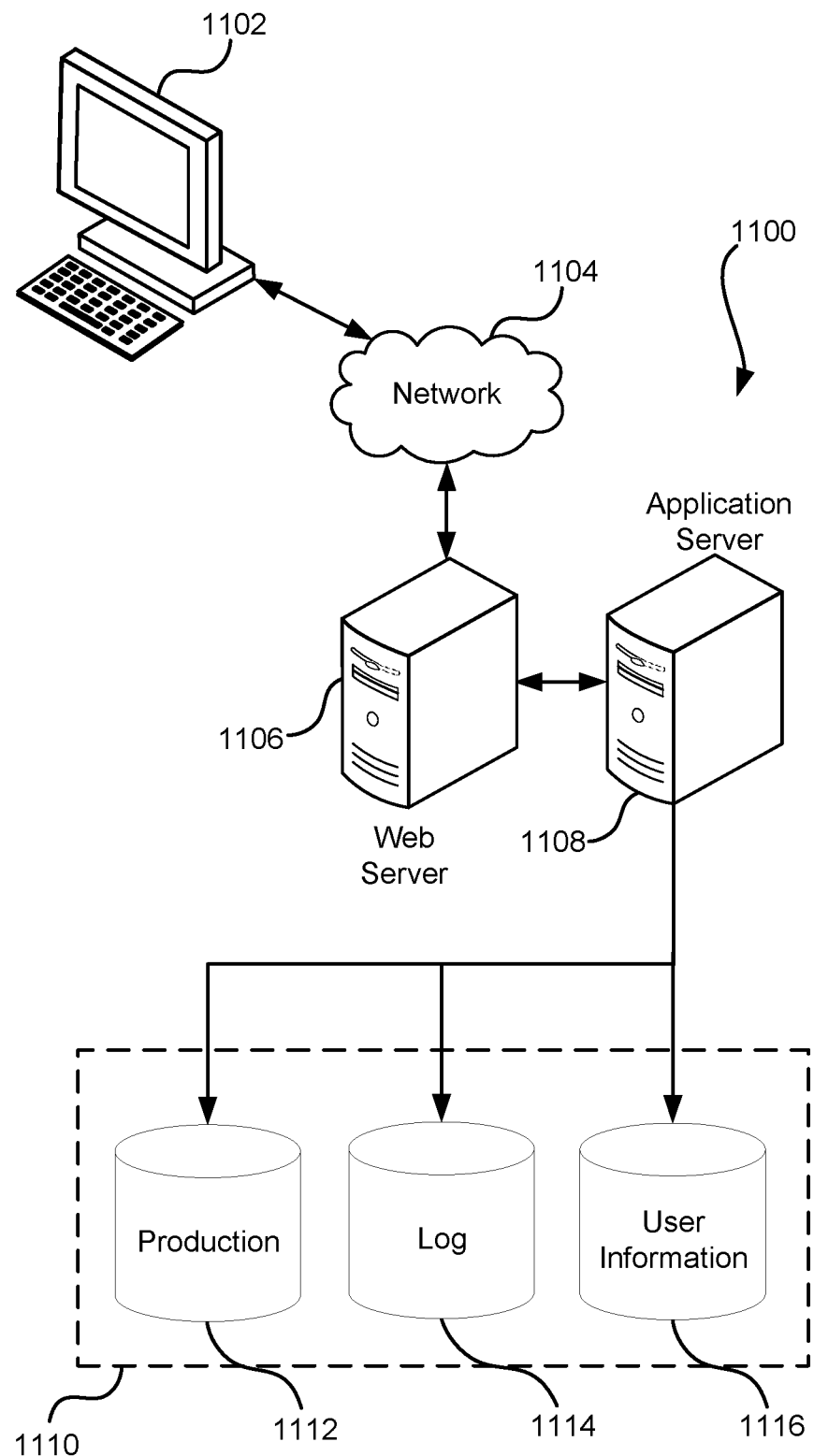
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a network latency metric measured between an endpoint node in a network and a client device, wherein the endpoint node includes a resource provided by a first datacenter;
   determining a fitness value associated with a migration of the endpoint node to a new location within the network based at least in part on the network latency metric;
   selecting, based at least in part on the fitness value indicating an improvement in the network latency metric for the endpoint node, the new location to be a migration location within the network for the endpoint node; and
   performing an operation that causes the endpoint node to be migrated to the migration location, wherein the migration location comprises a second datacenter.

2. The computer-implemented method of claim 1, wherein the client device comprises a mobile device.

3. The computer-implemented method of claim 1, wherein at least one of the first datacenter or the second datacenter comprises a datacenter rack with limited capacity due to at least one limitation on storage, processing power, network bandwidth, or CPU cycles.

4. The computer-implemented method of claim 1, wherein the fitness value is determined at least in part based on resource availability of at least one of the first datacenter or the second datacenter.

5. A system, comprising:
   one or more processors; and
   memory including executable instructions that, as a result of execution by the one or more processors, cause a computer system to at least:
      determine, using a fitness function that aggregates a network performance metric and a constraint parameter, a fitness value associated with migrating a service of a network from a first location to one or more new locations within the network, wherein the constraint parameter places one or more restrictions on the migrating based at least in part on one or more of a number of migrations, a frequency of migrations, or to retain redundancy;
      select a candidate location from the one or more new locations for the service, the candidate location selected based at least in part on the one or more new locations satisfying a placement improvement criteria that is based at least in part on the fitness value; and
      migrate the service to the candidate location.

6. The system of claim 5, the first location comprises a first datacenter, and the candidate location comprises a second datacenter.

7. The system of claim 5, wherein the first location comprises a first virtual machine, and the candidate location comprises a second virtual machine.

8. The system of claim 5, wherein the network performance metric comprises a network latency between the service and a client device.

9. The system of claim 5, wherein the network performance metric comprises at least one of: network latency, network bandwidth, network route complexity, service redundancy, resource availability, physical distance, or logical distance.

10. The system of claim 5, wherein the executable instructions that cause the system to determine the fitness value further cause the system to:
    evaluate, based at least in part on the network performance, a utility function to produce the fitness value.

11. The system of claim 10, wherein the utility function is further based at least in part on migration costs which comprises at least one of: host machine capacity, cost of service host machine capacity, service host machine central processing unit utilization, or service host machine memory utilization.

12. The system of claim 10, wherein the utility function is further based at least in part on security costs which include at least one of: a number of network connection steps between connected services or network connection types between connected services.

13. The system of claim 5, wherein the service belongs to a set of communication nodes which contains at least one endpoint communication node and one or more communication nodes configured to connect to the at least one endpoint communication node.

14. The system of claim 5, wherein the executable instructions which cause the computer system to migrate the first communication node to the candidate location further include executable instructions that cause the computer system to instantiate one or more new services corresponding to the service at the candidate location.

15. A non-transitory computer-readable storage medium having stored thereon executable instructions that, as a result of execution by one or more processors of a computer system, cause the computer system to at least:

determine, using a fitness function based at least in part on a system metric between a client device and a service of a network, a fitness value associated with migrating the service from a first location to one or more new locations within the network, wherein the system metric comprises network latency between the client device and the service; and place the service in a new location of the one or more new locations within the network, the new location based at least in part on satisfying a placement improvement criteria that is based at least in part on the fitness value.

16. The non-transitory computer-readable storage medium of claim 15, wherein the first location comprises a first datacenter, rack, host, or virtual machine, and the new location comprises a second datacenter, rack, host, or virtual machine.

17. The non-transitory computer-readable storage medium of claim 15, wherein the system metric further comprises at least one of network bandwidth, network route complexity, service redundancy, resource availability, physical distance, or logical distance.

18. The non-transitory computer-readable storage medium of claim 15, wherein the placement improvement criteria comprises an improvement in the network latency.

19. The non-transitory computer-readable storage medium of claim 15, wherein the first location comprises an endpoint of the service.

20. The non-transitory computer-readable storage medium of claim 15, wherein the instructions, when executed by one or more processors of a computer system, cause the computer system to place the service in a new location further cause the computer system to:

distribute the service among multiple instances; and
place at least one instance of the multiple instances in the new location.

* * * * *